US009854457B2

United States Patent
Ozturk et al.

(10) Patent No.: US 9,854,457 B2
(45) Date of Patent: Dec. 26, 2017

(54) MANAGEMENT OF COMMUNICATIONS WITH MULTIPLE ACCESS POINTS BASED ON INTER-ACCESS POINT COMMUNICATIONS

(71) Applicant: QUALCOMM Incorporated, San Diego, CA (US)

(72) Inventors: Ozcan Ozturk, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 14/224,825

(22) Filed: Mar. 25, 2014

(65) Prior Publication Data

US 2014/0301201 A1 Oct. 9, 2014

Related U.S. Application Data

(60) Provisional application No. 61/807,973, filed on Apr. 3, 2013.

(51) Int. Cl.
| | |
|---|---|
| *H04W 24/02* | (2009.01) |
| *H04W 36/22* | (2009.01) |
| *H04W 36/28* | (2009.01) |
| *H04W 76/02* | (2009.01) |
| *H04W 92/20* | (2009.01) |
| *H04W 28/16* | (2009.01) |

(52) U.S. Cl.
CPC .......... *H04W 24/02* (2013.01); *H04W 36/22* (2013.01); *H04W 28/16* (2013.01); *H04W 36/28* (2013.01); *H04W 76/025* (2013.01); *H04W 92/20* (2013.01)

(58) Field of Classification Search
None
See application file for complete search history.

(56) References Cited

U.S. PATENT DOCUMENTS

2008/0167041 A1\* 7/2008 Wang et al. ................. 455/436
2009/0253426 A1\* 10/2009 Qiu et al. ................... 455/426.1
(Continued)

FOREIGN PATENT DOCUMENTS

GB 2489716 A 10/2012
WO WO-2011000414 A1 1/2011
(Continued)

OTHER PUBLICATIONS

ISA/EPO, International Search Report and Written Opinion of the International Searching Authority, Int'l App. No. PCT/US2014/031894, dated Oct. 10, 2014, European Patent Office, Rijswijk, NL, 12 pgs.

*Primary Examiner* — Christopher Crutchfield
*Assistant Examiner* — Tito Pham
(74) *Attorney, Agent, or Firm* — Holland & Hart LLP

(57) ABSTRACT

Methods, systems, and apparatuses are described for managing communications in a wireless communications system. An inter-access point communications link between a first access point and a second access point is established. At the first access point, one or more performance statistics from the second access point are received via the inter-access point communications link. Communication to or from a mobile device via the first access point and the second access point, is managed based at least in part on the received performance statistics.

31 Claims, 11 Drawing Sheets

(56) References Cited

U.S. PATENT DOCUMENTS

| | | | | |
|---|---|---|---|---|
| 2011/0170516 A1* | 7/2011 | Hu | ................... | H04W 36/0033 |
| | | | | 370/331 |
| 2012/0005177 A1* | 1/2012 | Bao et al. | ..................... | 707/705 |
| 2012/0120927 A1* | 5/2012 | Bucknell | ............... | H04B 7/022 |
| | | | | 370/336 |
| 2012/0149378 A1* | 6/2012 | Li | ..................... | H04W 36/0055 |
| | | | | 455/438 |

FOREIGN PATENT DOCUMENTS

| | | |
|---|---|---|
| WO | WO-2012034035 A1 | 3/2012 |
| WO | WO-2013067464 A1 | 5/2013 |
| WO | WO-2013180955 A1 | 12/2013 |

\* cited by examiner

MANAGEMENT OF COMMUNICATIONS WITH MULTIPLE ACCESS POINTS BASED ON INTER-ACCESS POINT COMMUNICATIONS

CROSS REFERENCES

The present application for patent claims priority to U.S. Provisional Patent Application No. 61/807,973 by Ozturk et al., entitled "Management of Communications With Multiple Access Points Based on Inter-Access Point Communications," filed Apr. 3, 2013, assigned to the assignee hereof, and expressly incorporated by reference herein.

BACKGROUND

The following relates generally to wireless communications, and more specifically to mobile device communications with multiple access points. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of access points (e.g., cellular network base stations or wireless local area network (WLAN) access points), each simultaneously supporting communication for multiple mobile devices. Access points may communicate with mobile devices on downstream and upstream links (e.g., downlinks and uplinks). Each access point may have a range, which range may be referred to as the coverage area of the access point. A mobile device may communicate with an access point when it is within range of the access point.

When a mobile device is within range of two or more access points, an access point with which the mobile device is communicating (e.g., an anchor access point) may decide to offload a number of data flows to a booster anchor point within range of the mobile device. This may be done, for example, to improve the traffic load on the anchor access point, or because the signal quality of a communication link (or communication channel) between the mobile device and the anchor access point is of lower quality than desired. The booster access point may then forward communications from the anchor access point to the mobile device or forward communications from the mobile device to the anchor access point. The anchor access point may control the activation and deactivation of the mobile device's connection with the booster access point. In some cases, an anchor access point may control the activation and deactivation of a mobile device's connections to multiple booster access points.

SUMMARY

The present description generally relates to one or more improved methods, systems, and/or apparatuses for managing communication between multiple access points and one or more mobile devices. In a wireless communications system, a mobile device, or user equipment (UE), may be allowed to have connectivity to more than one wireless access point (e.g., more than one base station, evolved Node B (eNB), or WLAN access point). In such instances, one access point may act as an "anchor" (e.g., an anchor access point) and control the activation and deactivation of connections with other "booster" access points. In certain examples, controlling the activation and deactivation of connections may comprise managing the resources and/or data flow of the booster access point. For example, an anchor access point may request that a booster access point transmit certain data flows to or from a mobile device. The anchor access point may also request to move certain data flows of the mobile device from the booster access point back to the anchor access point.

In accordance with a first set of illustrative embodiments, a disclosed method for managing communications in a wireless communications system is described. In accordance with the method, an inter-access point communications link may be established between a first access point and a second access point. One or more performance statistics may be received at the first access point, from the second access point, via the inter-access point communications link. Communication to or from a mobile device via the first access point and the second access point may be managed based at least in part on the received performance statistics.

In some examples, managing communication to or from the mobile device may comprise managing data flows, carrier allocation, or centralized scheduling of resources between the first and second access points. In certain examples, receiving the one or more performance statistics may include receiving one or more performance statistics for the mobile device. The mobile device may be in communication with at least the second access point. In some examples, managing the one or more data flows may include using the one or more performance statistics to determine whether to switch at least a portion of the one or more data flows from the second access point to the first access point when the mobile device is known to or in communication with the first access point. In yet other examples, managing the one or more data flows may include using the one or more performance statistics to determine whether to switch at least a portion of the one or more data flows from the first access point to the second access point when the mobile device is in communication with the first access point.

In certain examples, a request may be transmitted to the second access point to report the one or more performance statistics. The request may, in some cases, include instructions to report the one or more performance statistics periodically or when an event trigger occurs. In some cases, the one or more performance statistics may include one or more performance statistics for the mobile device, and the event trigger may occur when at least one of the performance statistics for the mobile device satisfies a threshold. In other cases, the one or more performance statistics may include one or more performance statistics for the second access point, and the event trigger may occur when at least one of the performance statistics for the second access point satisfies a threshold.

In some examples, the one or more performance statistics may include at least one statistic indicating radio resource usage by the mobile device, transmission delay of packets, and served throughput to or from the mobile devices. In yet further examples, the one or more performance statistics may include at least one statistic relating to channel information between the mobile device and the second access point. In some examples, the one or more performance statistics may include at least one statistic related to a signal quality measured by the mobile device for at least one access point. The one or more performance statistics may further include at least one statistic related to loading or utilization of the inter-access point communications link.

According to a second set of illustrative embodiments, an apparatus for managing communications in a wireless communications system is also described. The apparatus may include a processor, a memory in electronic communication with the processor, and instructions stored in the memory. The instructions may be executable by the processor to: establish an inter-access point communications link between a first access point and a second access point; receive, at the first access point, one or more performance statistics from the second access point via the inter-access point communications link; and manage communication to or from a mobile device via the first access point and the second access point based at least in part on the received performance statistics. In certain examples, the device may further implement one or more aspects of the method for managing communications in a wireless communications system described above with respect to the first set of illustrative embodiments.

According to a third set of illustrative embodiments, an apparatus for managing communications in a wireless communications system is also described. The apparatus may include a means for establishing an inter-access point communications link between a first access point and a second access point; a means for receiving, at the first access point, one or more performance statistics from the second access point via the inter-access point communications link; and a means for managing communication to or from a mobile device via the first access point and the second access point based at least in part on the received performance statistics. In certain examples, the device may further include means for implementing one or more aspects of the method for managing communications in a wireless communications system described above with respect to the first set of illustrative embodiments.

A computer program product for managing communications in a wireless communications system is also described. The computer program product may include a non-transitory computer-readable medium storing instructions executable by a processor to: establish an inter-access point communications link between a first access point and a second access point; receive, at the first access point, one or more performance statistics from the second access point via the inter-access point communications link; and manage communication to or from a mobile device via the first access point and the second access point based at least in part on the received performance statistics. In certain examples, the computer program product may further implement one or more aspects of the method for managing communications in a wireless communications system described above with respect to the first set of illustrative embodiments.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
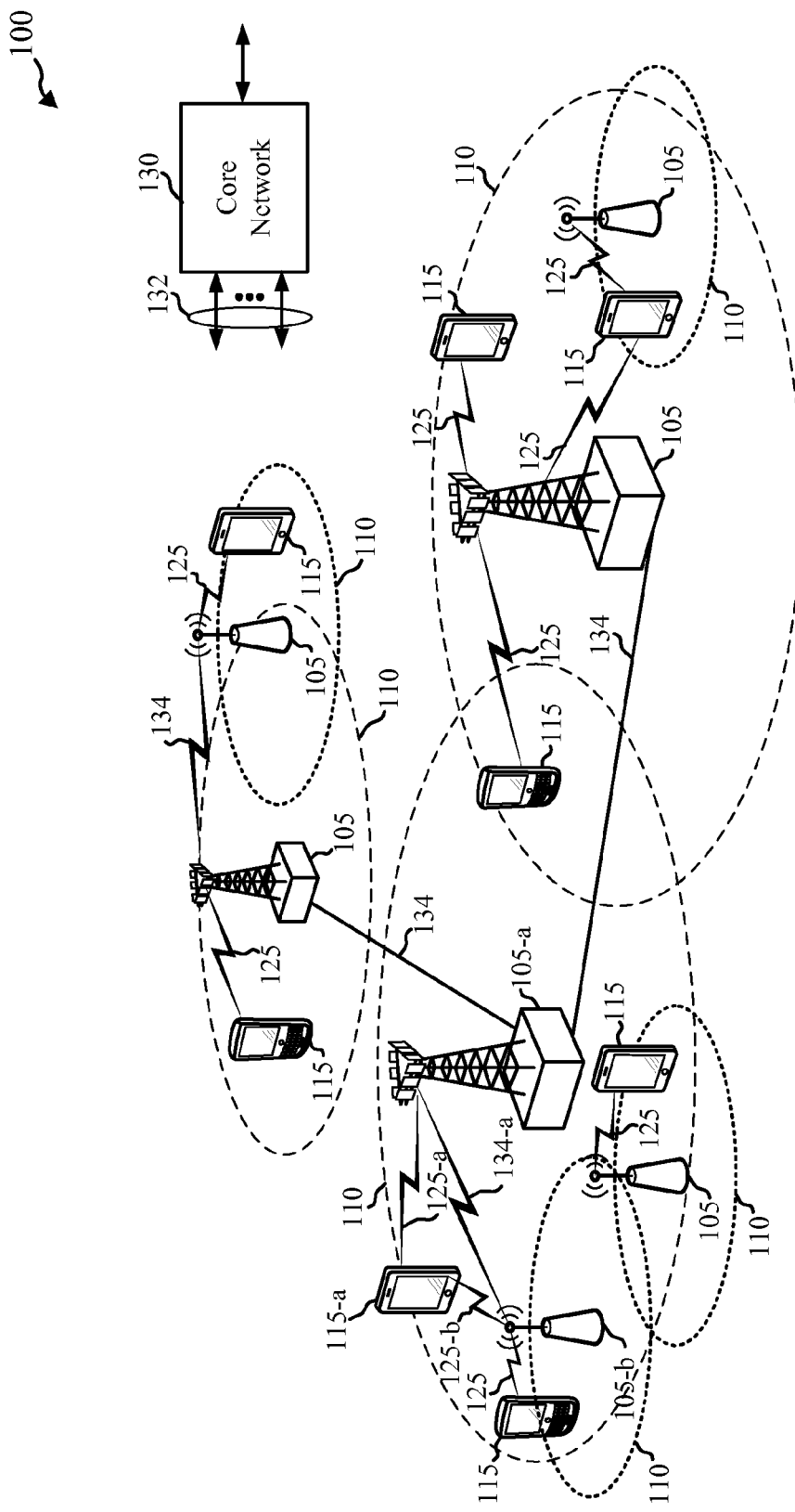
FIG. 1 shows a block diagram of a wireless communications system.

Management of communications in wireless communications systems is described. In a wireless communications system, a mobile device, or user equipment (UE), may be allowed to have connectivity to more than one wireless access point (e.g., more than one base station, evolved Node B (eNB), or WLAN access point). In some wireless communications systems, a mobile device may be allowed to have connectivity to more than one access point for both its downlink and uplink communications. In these cases, one access point may act as an "anchor" (e.g., an anchor access point) and control the activation and deactivation of connections with other "booster" access points. For example, an anchor access point may request that a booster access point transmit certain data flows to or from a mobile device. The anchor access point may also request to move certain data flows of the mobile device from the booster access point back to the anchor access point. To this end, knowledge of the performance of the mobile device(s) and the booster access point(s) may assist the anchor access point in deciding whether to switch data flows between access points. As described below, performance statistics for a mobile device or booster access point may be conveyed to an anchor access point via an inter-access point communications link between the booster access point and the anchor access point.

As disclosed, the signaling between access points may be extended to include reports of performance statistics for mobile devices and booster access points. The reports may include performance statistics such as the usage of radio resources (e.g., resource block usage and time ratio in Long Term Evolution (LTE) or LTE-A communications system (LTE/LTE-A communications system)), scheduling and transmission delays, and served throughput. These performance statistics may be reported per data flow (bearer) for a specific mobile device. A report may also include information such as: the location of a mobile device, whether the mobile device is in an extended range (CRE), channel information such as channel quality information (CQI), path loss information, or transmit power headroom.

A report may be requested by an anchor access point and sent by a booster access point immediately or periodically. The desired periodicity of the report may be included in a report request. A booster access point may also send a report without a request, or based on certain triggers for performance (such as when the mobile device throughput drops below a threshold or RB usage exceeds a threshold). The triggers may be configured by operations and management or requested by an anchor access point. The information collected for certain mobile devices can also be used by an anchor access point in deciding actions for other mobile devices.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The wireless communications system 100 includes a plurality of access points (e.g., base stations, eNBs, or WLAN access points) 105, a number of mobile devices 115, and a core network 130. Some of the access points 105 may communicate with the mobile devices 115 under the control of a base station controller (not shown), which may be part of the core network 130 or certain access points 105 (e.g., base stations or eNBs) in various embodiments. Some of the access points 105 may communicate control information and/or user data with the core network 130 through backhaul links 132. In some embodiments, some of the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the mobile devices 115 via one or more access point antennas. Each of the access points 105 may provide communication coverage for a respective geographic coverage area 110. In some embodiments, an access point 105 may be referred to as a base station, a base transceiver station, a radio base station, a radio transceiver, a basic service set (BSS), an extended service set (ESS), a NodeB, an evolved NodeB (eNB), a Home NodeB, a Home eNodeB, a WLAN access point, or some other suitable terminology. The geographic coverage area 110 for an access point may be divided into sectors making up only a portion of the coverage area (not shown). The wireless communications system 100 may include access points 105 of different types (e.g., macro, micro, and/or pico base stations). The access points 105 may also utilize different radio technologies. There may be overlapping coverage areas for different types and radio technologies.

In some embodiments, the wireless communications system 100 may be or include an LTE/LTE-A communications system (or network). In LTE/LTE-A communications systems, the terms evolved Node B (eNB) and user equipment (UE) may be generally used to describe the access points 105 and mobile devices 115, respectively. The wireless communications system 100 may also be a Heterogeneous LTE/LTE-A network in which different types of eNBs provide coverage for various geographical regions. For example, each eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the access points 105 via a backhaul link 132 (e.g., S1, etc.). The access points 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The mobile devices 115 may be dispersed throughout the wireless communications system 100, and each mobile device may be stationary or mobile. A mobile device 115 may also be referred to by those skilled in the art as a UE, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A mobile device 115 or UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in the wireless communications system 100 may include uplinks for carrying uplink (UL) transmissions (e.g., from a mobile device 115 to an access point 105) and/or downlinks for carrying downlink (DL) transmissions (e.g., from an access point 105 to a mobile device 115). The UL transmissions may also be called reverse link transmissions, while the DL transmissions may also be called forward link transmissions.

As shown, a mobile device 115 115-a or UE may simultaneously or alternately communicate over a first communication link 125-a with a first access point 105-a and over a second communication link 125-b with a second access point 105-b. The first and second access points 105-a, 105-b may also communicate with each other, over a backhaul link 134-a (e.g., an X2 link of an LTE/LTE-A wireless communications system). In some embodiments, the access point 105-a may define a macro eNB of an LTE/LTE-A system, and the access point 105-b may define a smaller coverage area eNB of an LTE/LTE-A system or a WLAN coverage area of a WLAN system. For purposes of illustration only, and not limitation, the access point 105-a may be an anchor access point and may determine when to switch data flows of the mobile device 115-a to/from the booster access point 105-b. As described herein, the anchor access point's determinations to switch data flows may be based at least in part on performance statistics of the mobile device 115-a or the booster access point 105-b received at the anchor access point 105-a over inter-access point communications backhaul link 134-a.

In certain examples, the anchor access point 105-a may manage the resources of the booster access point 105-b based at least in part on the performance statistics of the booster access point 105-b received at the anchor access point 105-a. In such examples, managing the booster access point 105-b may comprise adding or removing certain carriers of the booster access point 105-b based at least in part on the performance statistics of each carrier.

Figure 2:
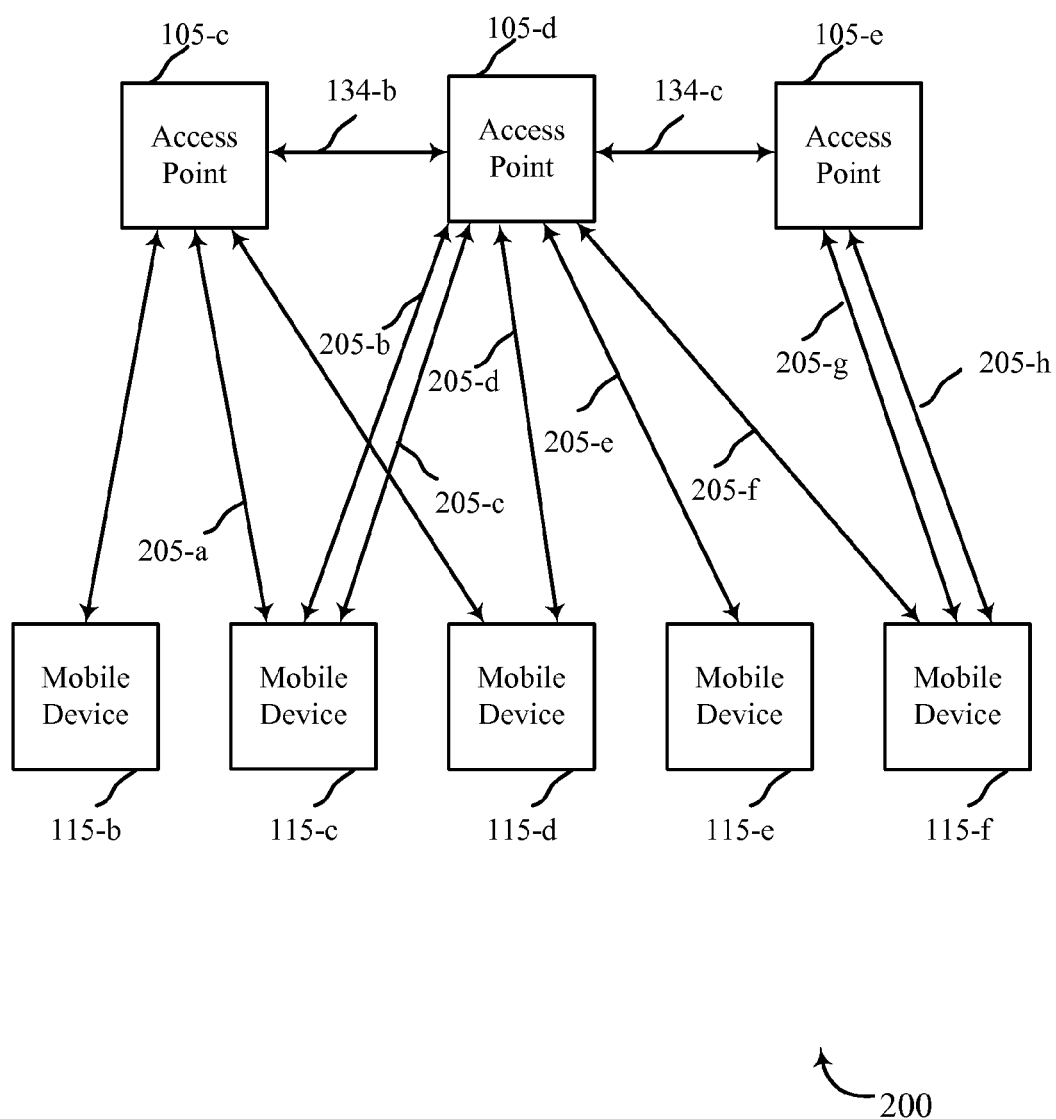
FIG. 2 shows a block diagram of another wireless communications system.

Referring now to FIG. 2, a diagram illustrates an example of a wireless communications system 200. The wireless communications system 200 may include a plurality of access points 105-c, 105-d, and 105-e and mobile devices 115-b, 115-c, 115-d, 115-e, and 115-f. The wireless communications system 200 may be an example of one or more aspects of the wireless communications system 100 described with reference to FIG. 1. The access points 105-c, 105-d, 105-e may provide access to the same or different networks. In some cases, one or more of the access points 105-c, 105-d, 105-e may take the form of a base station, eNB or other access point 105 described with reference to FIG. 1.

The mobile devices 115-b, 115-c, 115-d, 115-e, 115-f may each communicate with one or more of the access points 105-c, 105-d, 105-e. By way of example, the mobile device 115-c is shown to have established a first data flow 205-a with access point 105-c, and second and third data flows 205-b, 205-c with access point 105-d. Each of the data flows 205-b, 205-c may be an uplink data flow, a downlink data flow, or a shared (e.g., multiplexed) uplink/downlink data flow. Also by way of example, the access point 105-d is shown to service the second and third data flows 205-b, 205-c of the mobile device 115-c, a data flow 205-d of the mobile device 115-d, a data flow 205-e of the mobile device 115-e, and a data flow 205-f of the mobile device 115-f. Communications over the data flows 205-b, 205-c, 205-d between the mobile devices 115-c and 115-d and the access point 105-d may be provided or received to/from the access point 105-c over backhaul link (or inter-access point communications link) 134-b. In this manner, access point 105-c may serve as an anchor access point and selectively switch data flows to/from the booster access point 105-d.

The data flow management determinations made by access point 105-c may be based at least in part on performance statistics received from access point 105-d. The performance statistics may pertain to the mobile device 115-c or 115-d, to other mobile devices 115-e, 115-f served by the access point 105-d, or to the access point 105-d itself. These performance statistics may be communicated to the access point 105-c via the access point 105-d and inter-access point communications backhaul link 134-b.

In yet further example, communications over data flows 205-g, 205-h between the mobile devices 115-f and access point 105-c may be provided or received to/from the access point 105-d over backhaul link (or inter-access point communications link) 134-c. In certain examples of the illustrative embodiments, access point 105-d may schedule resource coordination between multiple access points 105-c, 105-d, and 105-e or provide centralized scheduling of resources between multiple access points 105-c, 105-d, and 105-e. In such instances, access point 105-d may serve as an anchor access point 105-d and selectively switch data flow from the booster access points 105-c and 105-e. In certain examples, anchor access point 105-d may act as a master access point, with multiple booster access points 105-c and 105-e functioning as slaves.

In some examples, the access point 105-d, serving as an anchor access point, may add or remove a certain booster access points 105-c and 105-e based at least in part on the received performance statistics In such instances, adding or removing booster access points 105-c, 105-e may comprise adding or removing selective carrier resources of the booster access points 105-c, 105-e and/or allocating carrier resources.

Figure 3:
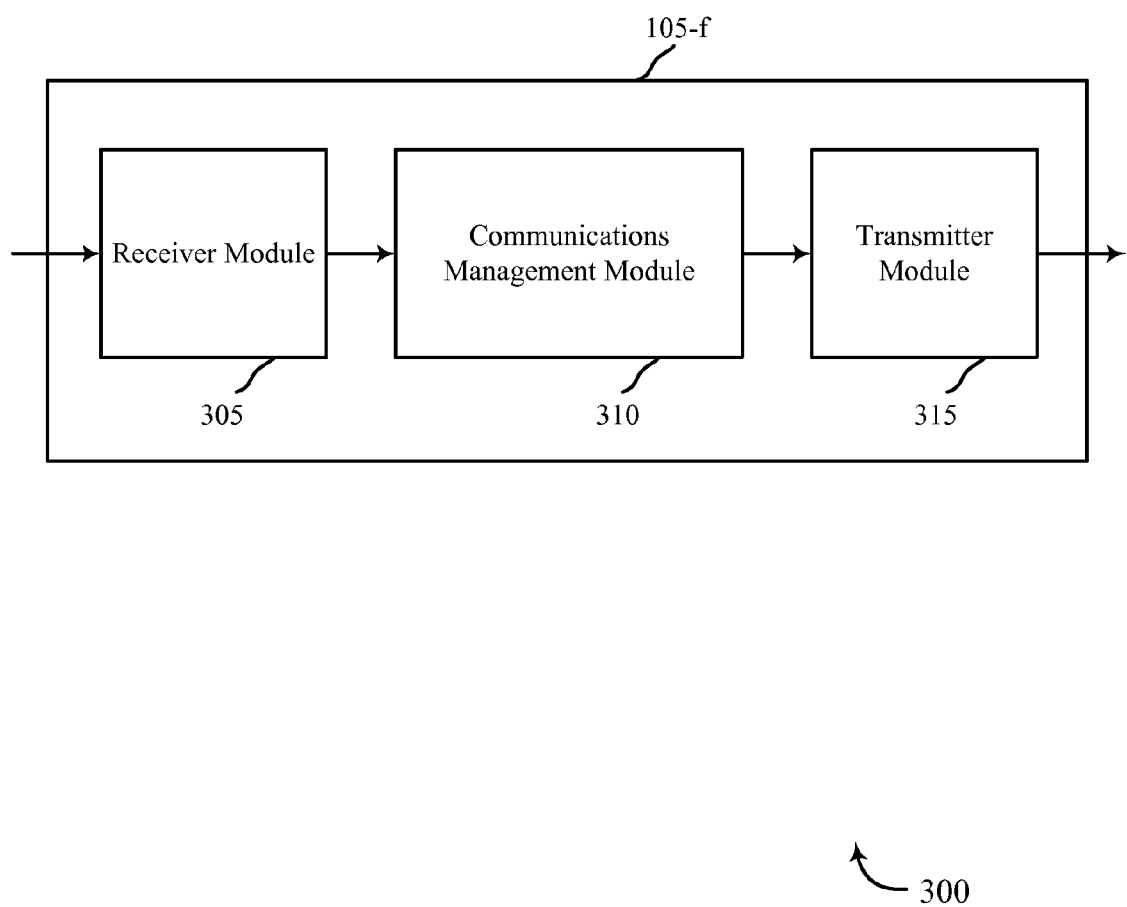
FIG. 3 shows a block diagram of a device for managing communications in a wireless communications system in accordance with various embodiments.

Referring now to FIG. 3, a block diagram 300 illustrates a device 105-f in accordance with various embodiments. The device 105-f may be an example of one or more aspects of one of the access points 105 described with reference to FIGS. 1 and/or 2. The device 105-f may also be a processor. The device 105-f may include a receiver module 305, a communications management module 310, and/or a transmitter module 315. Each of these components may be in communication with each other.

The components of the device 105-f may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 305 may be or include a cellular receiver and/or a wireless local area network (WLAN) receiver, and in some cases may be or include an LTE/

LTE-A receiver and/or WLAN receiver. The receiver module 305 may be used to receive various types of data and/or control signals (i.e., transmissions) over one or more communication channels of a wireless communications system, such as the wireless communications system 100 or 200 shown in FIG. 1 or 2.

The transmitter module 315 may be or include a cellular transmitter and/or a WLAN transmitter, and in some cases may be or include an LTE/LTE-A transmitter and/or a WLAN transmitter. The transmitter module 315 may be used to transmit various types of data and/or control signals over one or more communication channels of a wireless communications system, such as the wireless communications system 100 or 200 shown in FIG. 1 or 2.

The communications management module 310 may perform various functions. In some embodiments, the communications management module 310 may establish an inter-access point communications link between a first access point (e.g., the device 105-f) and a second access point (e.g., one of the access points 105 shown in FIGS. 1 and/or 2). The communications management module 310 may then receive one or more performance statistics from the second access point via the inter-access point communications link. The communications management module may also manage communication to or from a mobile device 115 via the first access point and the second access point, based at least in part on the received performance statistics. In some examples, communications management module 310 manages at least one or more of data flows, carrier allocation, or centralized scheduling of resources between multiple booster access points.

Figure 4:
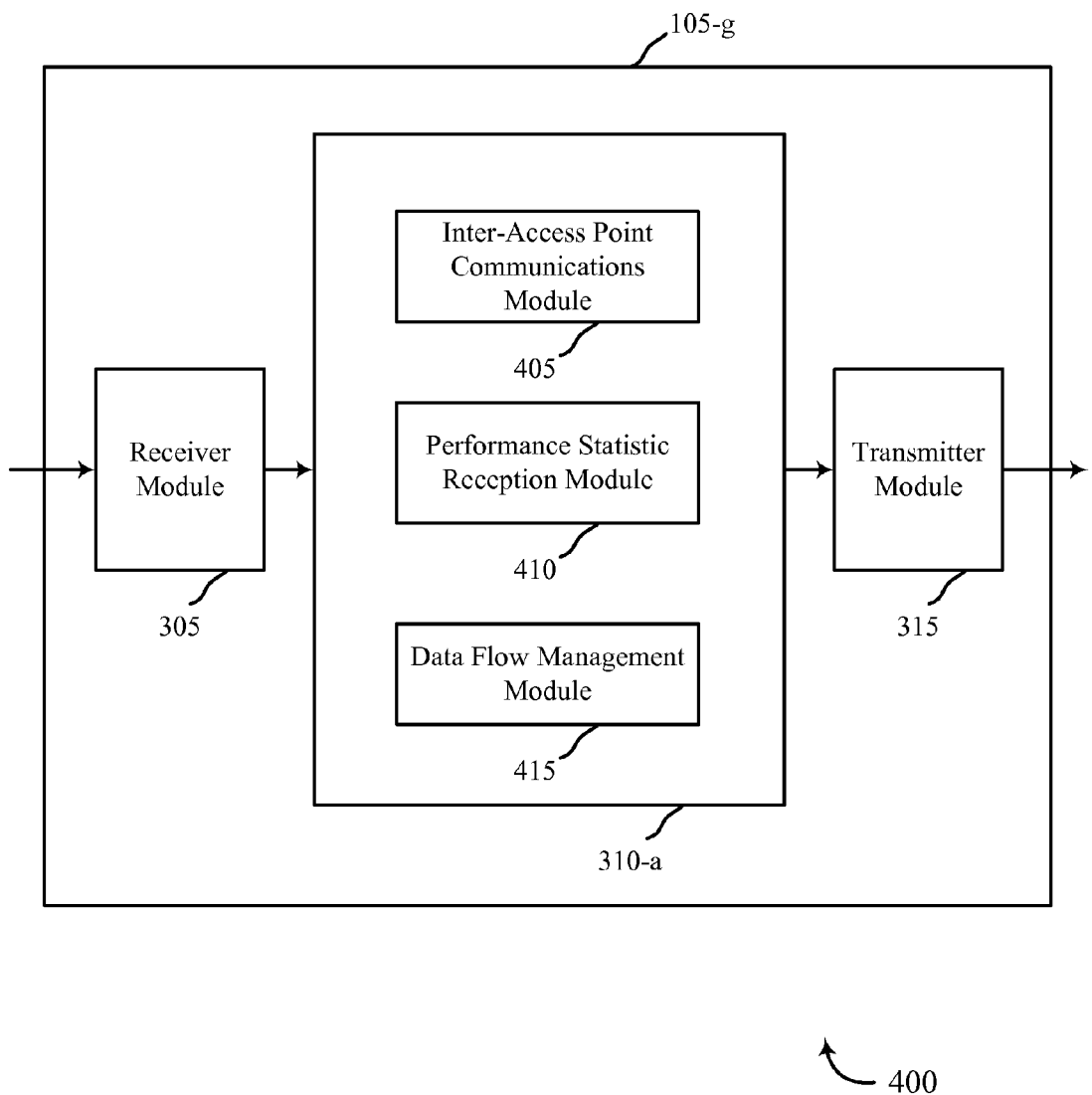
FIG. 4 shows a block diagram of another device for managing communications in a wireless communications system in accordance with various embodiments.

Referring now to FIG. 4, a block diagram 400 illustrates a device 105-g in accordance with various embodiments. The device 105-g may be an example of one or more aspects of one of the access points 105 described with reference to FIGS. 1, 2, and/or 3. The device 105-g may also be a processor. The device 105-g may include a receiver module 305, a communications management module 310-a, and/or a transmitter module 315. Each of these components may be in communication with each other.

The components of the device 105-g may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 305 and transmitter module 315 may be configured similarly to what is described with respect to FIG. 3. The communications management module 310-a may be an example of the communications management module 310 described with reference to FIG. 3 and may include an inter-access point communications module 405, a performance statistic reception module 410, and/or a data flow management module 415. Each of these components may be in communication with each other.

The inter-access point communications module 405 may establish an inter-access point communications link between a first access point (e.g., the device 105-g) and a second access point (e.g., one of the access points 105 shown in FIGS. 1 and/or 2). The inter-access point communications module 405 may further provide communication management between a plurality of access points 105 in communication with the device 105-g. In certain examples, the inter-access point communications module 405 may provide centralized scheduling of resources and carrier allocation for a plurality of access points in the network.

The performance statistic reception module 410 may receive one or more performance statistics from the access point 105 with which the inter-access point communications link is established. In some cases, the performance statistic reception module 410 may receive one or more performance statistics for a mobile device, which mobile device 115 may have one or more data flows serviced by the device 105-g and/or the access point 105 with which the inter-access point communications link was established. The access point 105 to which the inter-access point communications link is connected may, in some cases, acquire the performance statistics for the mobile device by means of the mobile device being in communication with the access point. In some cases, there may be multiple mobile devices in communication with the access point, and the performance statistic reception module 410 may receive performance statistics for any and/or all of the mobile devices.

The performance statistic reception module 410 may also receive one or more performance statistics for the access point 105 to which the inter-access point communications link is connected.

In some embodiments, the performance statistic reception module 410 may receive one or more performance statistics per data flow (e.g., per data flow 205-b, 205-c, etc.) between a mobile device 115 and the access point 105 to which the inter-access point communications link connects. Alternately or additionally, the performance statistic reception module 410 may receive one or more cumulative performance statistics, where each cumulative performance statistic corresponds to a set of at least two data flows 205-b, 205-c between a mobile device 115 and the access point 105 to which the inter-access point communications link connects.

The data flow management module 415 may manage one or more data flows based at least in part on the received performance statistics. More particularly, the data flow management module 415 may manage one or more data flows to or from a mobile device 115 via the device 105-g and the access point 105 to which the inter-access point communications link is connected. Managing the one or more data flows may in some cases include using the one or more received performance statistics to determine whether to switch at least a portion of the one or more data flows from the access point 105 to which the inter-access point communications link connects to the device 105-g. Managing the one or more data flows may also, in some cases, include using the one or more received performance statistics to determine whether to switch at least a portion of the one or more data flows from the device 105-g to the access point 105 to which the inter-access point communications link connects.

Figure 5:
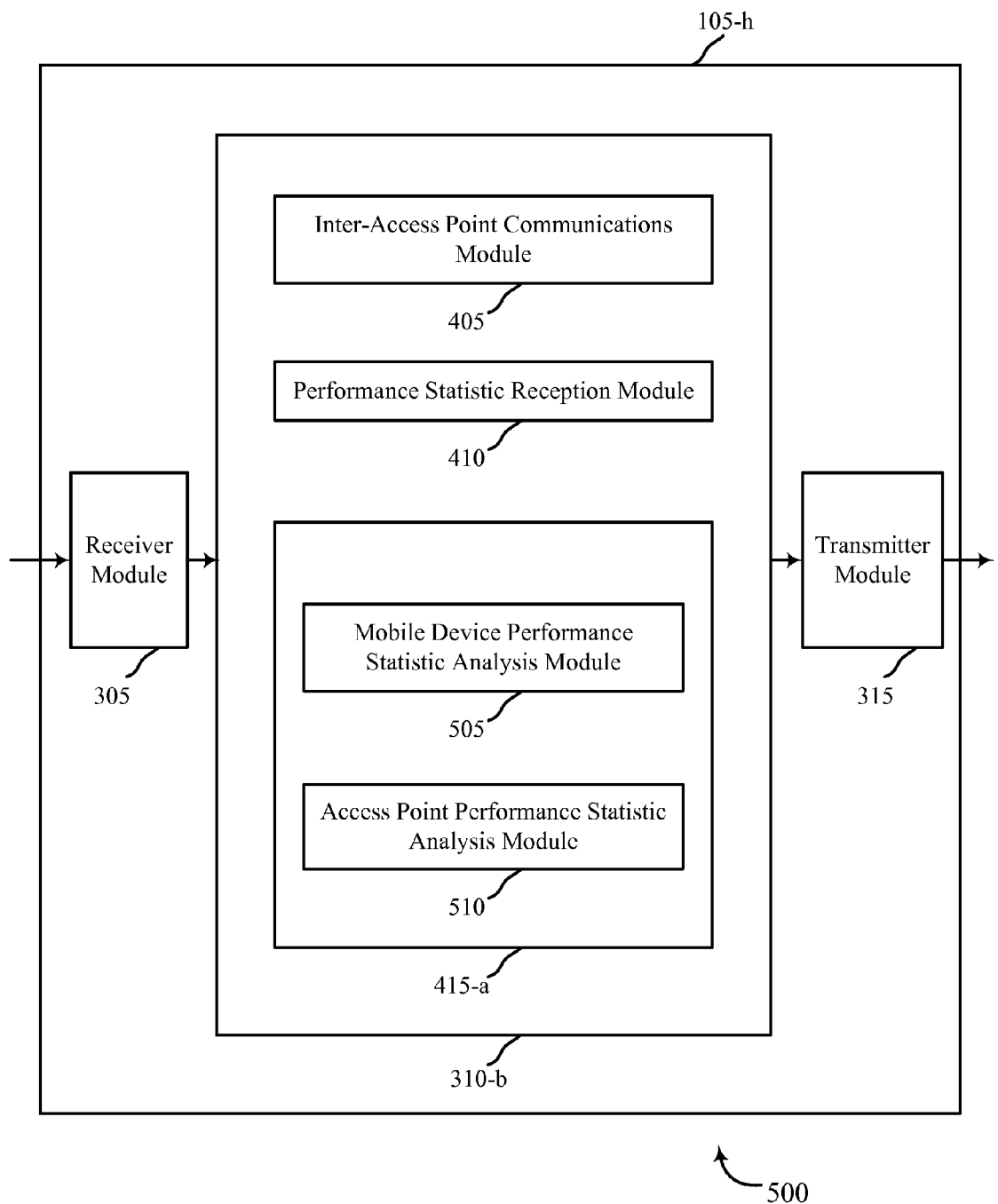
FIG. 5 shows a block diagram of yet another device for managing communications in a wireless communications system in accordance with various embodiments.

Referring now to FIG. 5, a block diagram 500 illustrates a device 105-h in accordance with various embodiments. The device 105-h may be an example of one or more aspects of one of the access points 105 described with reference to FIGS. 1, 2, 3, and/or 4. The device 105-h may also be a processor. The device 105-h may include a receiver module 305, a communications management module 310-b, and/or a transmitter module 315. Each of these components may be in communication with each other.

The components of the device 105-*h* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 305 and transmitter module 315 may be configured similarly to what is described with respect to FIG. 3. The communications management module 310-*b* may be an example of the communications management module 310 described with reference to FIGS. 3 and/or 4 and may include an inter-access point communications module 405, a performance statistic reception module 410, and/or a data flow management module 415-*a*. Each of these components may be in communication with each other. The inter-access point communications module 405 and performance statistic reception module 410 may be configured similarly to what is described with respect to FIG. 4. The data flow management module 415-*a* may also be configured similarly to what is described with respect to FIG. 4, but may also include a mobile device performance statistic analysis module 505 and an access point performance statistic analysis module 510.

The mobile device performance statistic analysis module 505 may analyze performance statistics related to one or more mobile devices 115 having data flows serviced by an access point 105 to which the inter-access point communications link is connected. These performance statistics may include, for example, performance statistics related to radio resource usage, transmission delays, served throughput, mobile device location, channel quality information (CQI), and/or whether a mobile device is in an extended range (e.g., in cell range expansion (CRE) mode). The data flow management module 415 may then base data flow management decisions (e.g., whether to switch data flows between access points) at least in part on the analyzed mobile device performance statistics.

The access point performance statistic analysis module 510 may analyze performance statistics related to the access point to which the inter-access point 105 communications link is connected. These performance statistics may include, for example, performance statistics related to the inter-access point communications link, individual or cumulative data flows or users serviced by the access point 105, radio resource usage by the access point 105, and/or scheduling priorities of the access point 105. The data flow management module 415 may alternately or also base data flow management decisions at least in part on the analyzed access point performance statistics.

Figure 6:
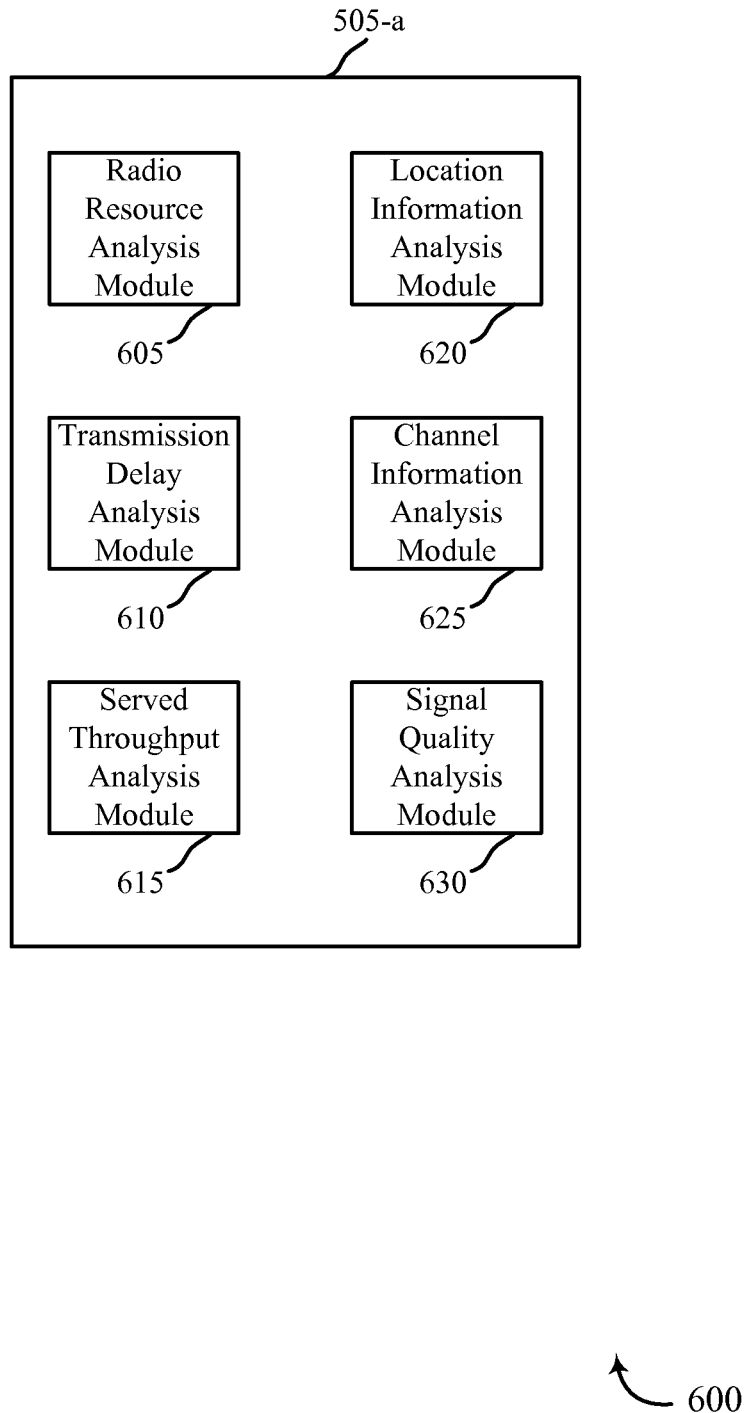
FIG. 6 shows a block diagram of a mobile device performance statistic analysis module in accordance with various embodiments.

Referring now to FIG. 6, a block diagram 600 illustrates a mobile device performance statistic analysis module 505-*a* in accordance with various embodiments. The mobile device performance statistic analysis module 505-*a* may include a radio resource analysis module 605, a transmission delay analysis module 610, a served throughput analysis module 615, a location information analysis module 620, a channel information analysis module 625, and/or a signal quality analysis module 630. Each of these components may be in communication with each other.

The radio resource analysis module 605 may analyze at least one statistic indicating radio resources usage by a mobile device for which data flows are being managed. The radio resource analysis module 605 may also analyze radio resource usage statistics for other mobile devices serviced by a booster access point, or, for example, the radio resource usage statistics for a set of mobile devices.

The transmission delay analysis module 610 may analyze at least one statistic indicating transmission delay of packets transmitted to or from a mobile device for which data flows are being managed. The transmission delay analysis module 610 may also analyze transmission delay statistics for other mobile devices having data flows serviced by a booster access point, or, for example, the average transmission delay for a set of mobile devices.

The served throughput analysis module 615 may analyze at least one statistic indicating a served throughput to or from a mobile device for which data flows are being managed. The served throughput analysis module 615 may also analyze served throughput statistics for other mobile devices having data flows serviced by a booster access point, or, for example, the average served throughput for a set of mobile devices.

The location information analysis module 620 may analyze information relating to a location of a mobile device for which data flows are being managed. The location information analysis module 620 may also analyze location information for other mobile devices having data flows serviced by a booster access point.

The channel information analysis module 625 may analyze at least one statistic relating to channel information, such as CQI, between a mobile device for which data flows are being managed and a booster access point. The served throughput analysis module 615 may also analyze channel information for other mobile devices having data flows serviced by a booster access point, or, for example, channel information for a set of mobile devices. In some examples, channel information analysis module 625 may analyze statistics relating to channel information of each carrier of the booster access point.

The signal quality analysis module 630 may analyze at least one statistic related to a signal quality measured by the mobile device for at least one access point. This analysis may be used to determine whether the mobile device is in CRE mode. Such an analysis may also be made for other mobile devices having data flows serviced by a booster access point.

Figure 7:
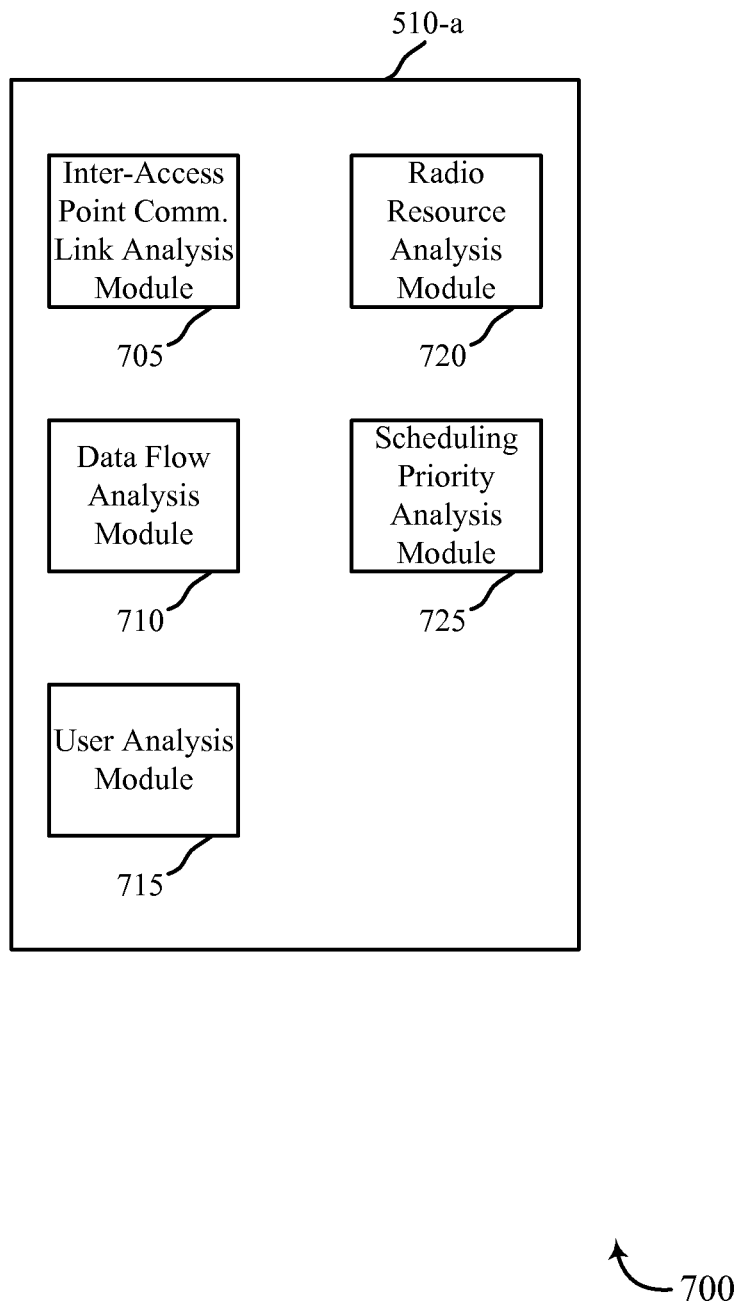
FIG. 7 shows a block diagram of an access point performance statistic analysis module in accordance with various embodiments.

Referring now to FIG. 7, a block diagram 700 illustrates an access point performance statistic analysis module 510-*a* in accordance with various embodiments. The access point performance statistic analysis module 510-*a* may include an inter-access point communications link analysis module 705, a data flow analysis module 710, a user analysis module 715, a radio resource analysis module 720, and/or a scheduling priority analysis module 725.

The inter-access point communications link analysis module 705 may analyze at least one statistic related to loading or utilization of the inter-access point communications link between two access points.

The data flow analysis module 710 may analyze at least one statistic related to a number of data flows a mobile device is having serviced at a booster access point. The data flow analysis module 710 may also analyze the number of data flows that other mobile devices are having serviced at the booster access point.

The user analysis module 715 may analyze at least one statistic related to a number of users (e.g., mobile devices)

that access, or are currently accessing, both a first access point and a second access point. Such would be the case for the mobile devices 115-c and 115-d with respect to the access point 105-d shown in FIG. 2. The user analysis module 715 may also analyze at least one statistic based on the number of users accessing both the second access point and other than the first access point. Such would be the case for the mobile device 115-f with respect to the access point 105-d shown in FIG. 2.

The radio resource analysis module 720 may analyze at least one statistic related to radio resource usage, including time and frequency usage, for mobile devices that access both a first access point and a second access point. The radio resource analysis module 720 may also analyze at least one statistic related to radio resource usage, including time and frequency usage, for mobile devices that access both the second access point and other than the first access point. The radio resource analysis module 720 may further analyze at least one statistic based on a quantity of maximum allowed radio resource usage, including time and frequency usage, for data flows belonging to users accessing both the second access point and other access points.

The scheduling priority analysis module 725 may analyze at least one statistic based on scheduling priorities at the second access point, for data flows belonging to users accessing the second access point and data flows belonging to users simultaneously accessing the second access point and other access points.

The outputs of the analysis module shown in FIGS. 6 and 7 may be used as a basis for managing data flows serviced by first and second access points, including the switching of data flows between the access points.

Figure 8:
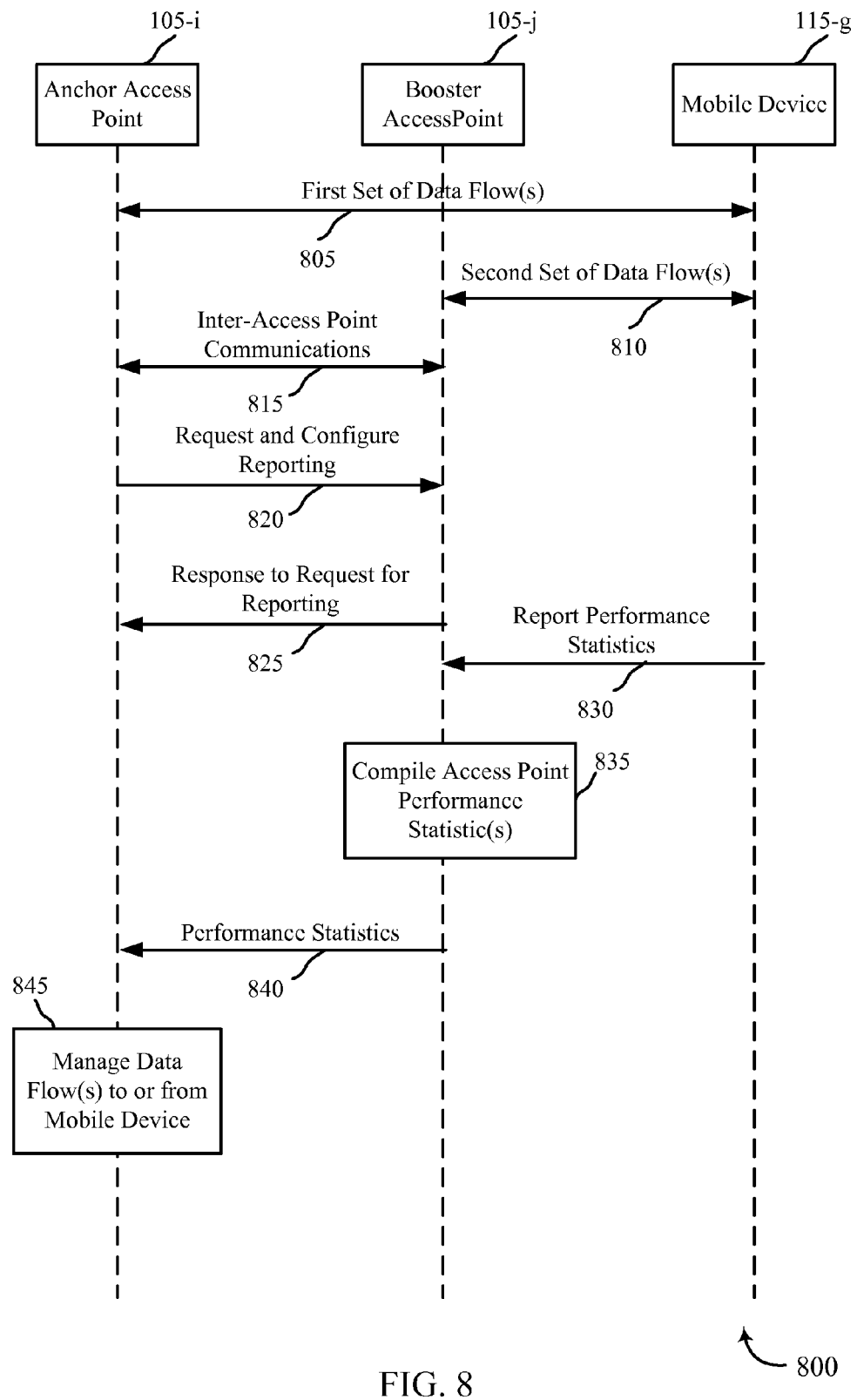
FIG. 8 shows an example message flow for managing communications between a mobile device and multiple access points.

Referring to FIG. 8, there is shown a message flow diagram 800. The message flow diagram 800 illustrates an exemplary message flow between an anchor access point 105-i, a booster access point 105-j, and a mobile device 115-g, in accordance with various embodiments. The access points 105-i, 105-j may be examples of the access points 105 shown in FIGS. 1, 2, 3, 4, and/or 5, and in some cases may be base stations, eNBs, or WLAN access points. The mobile device 115-g may be an example of one of the mobile devices 115 shown in FIGS. 1 and/or 2.

In accord with the exemplary message flow, messages forming a first set of one or more data flows may be exchanged between the anchor access point 105-i and mobile device 115-g at communication 805. Similarly, messages forming a second set of one or more data flows may be exchanged between the booster access point 105-j and the mobile device 115-g at communication 810.

At communication 815, inter-access point communications may be transmitted between the anchor access point 105-i and the booster access point 105-j. The inter-access point communications, in conjunction with the booster access point 105-j, may aid in ultimately forwarding communications from the anchor access point 105-i to the mobile device 115-g, and in forwarding communications from the mobile device 115-g to the anchor access point 105-i.

At communication 820, the anchor access point 105-i may transmit a request to report one or more performance statistics to the booster access point 105-j. The manner in which the booster access point 105-j reports the one or more performance statistics to the anchor access point 105-i may also be configured as part of the communication 820. By way of example, and in some embodiments, the booster access point may be configured to report one or more performance statistics periodically. In other embodiments, the booster access point may be configured to report one or more performance statistics when an event trigger occurs. When the one or more performance statistics include one or more performance statistics for a mobile device, the event trigger may occur when at least one of the performance statistics for the mobile device satisfies a threshold (e.g., surpasses a threshold, meets a threshold, falls below a threshold, etc.). When the one or more performance statistics include one or more performance statistics for the booster access point, the event trigger may occur when at least one of the performance statistics for the booster access point satisfies a threshold (e.g., surpasses a threshold, meets a threshold, falls below a threshold, etc.). In one example, a data flow or user load on the booster access point surpassing or falling below a threshold may be the event trigger that causes the booster access point to report one or more performance statistics to the anchor access point. In an LTE/LTE-A system, the request and configuration communication(s) at 825 may be sent in the X2 access point message RESOURCE STATUS REQUEST or in a new X2 access point message.

At communication 825, the booster access point 105-j may respond to the anchor access point's request for reporting. In an LTE/LTE-A system, the response from the booster access point 105-j may be sent in the X2 access point message RESOURCE STATUS RESPONSE or in a new X2 access point message.

At communication 830, the mobile device 115-g may report performance statistics, if any, to the booster access point 105-j. The timing of this reporting is arbitrary and may occur before or after various of the communications referenced in FIG. 8. In an LTE/LTE-A system, the performance statistics may be reported in the X2 access point message RESOURCE STATUS UPDATE or in a new X2 access point message.

At block 835, performance statistics for the booster access point 105-j, if any, may be compiled at the booster access point 105-j.

At communication 840, performance statistics for the mobile device 115-g and booster access point 105-j may be reported to the anchor access point 105-i. The performance statistics may be reported over an inter-access point communications link. The anchor access point 105-i may manage one or more data flows to or from the mobile device 115-g, based at least in part on the received performance statistics of the mobile device 115-g and/or booster access point 105-j.

Figure 9:
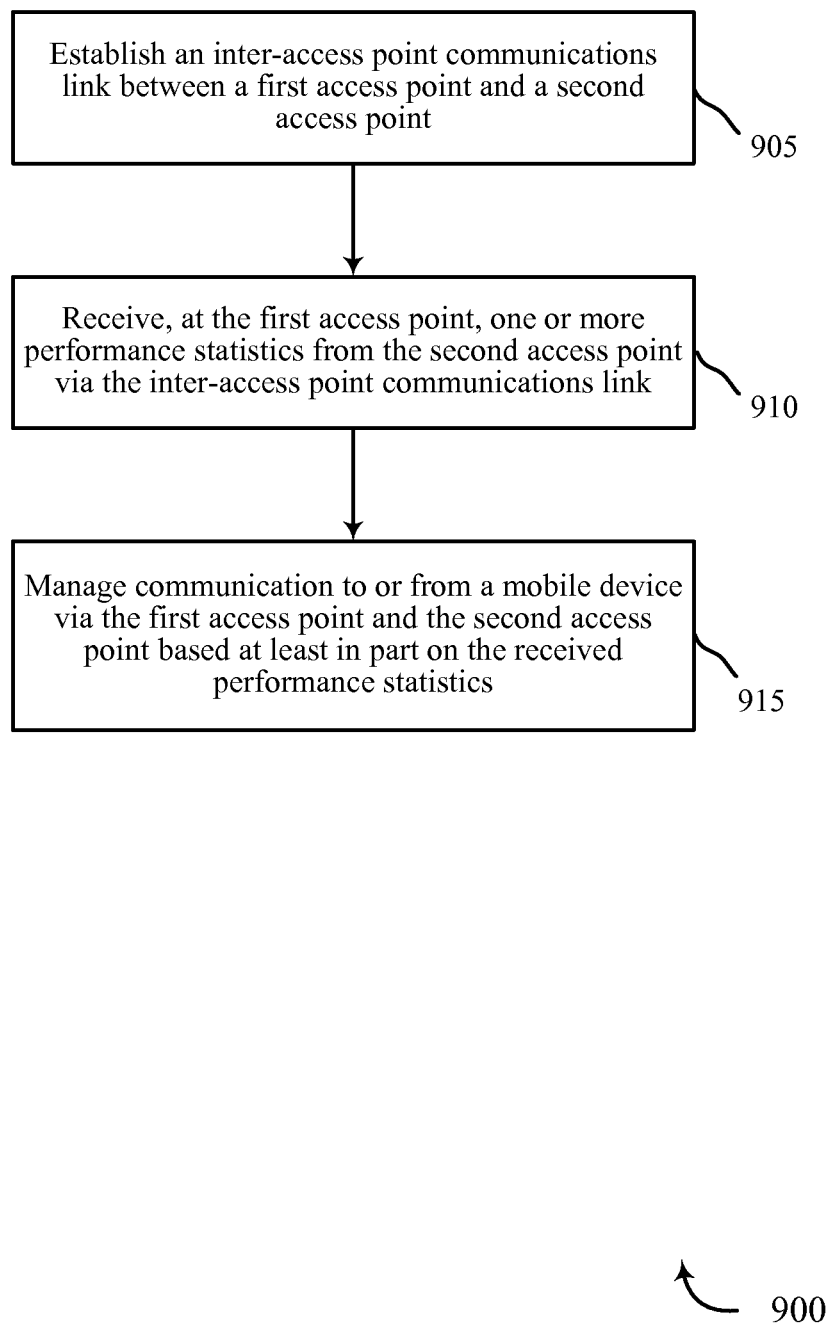
FIG. 9 is a flowchart illustrating an embodiment of a method for managing communications in a wireless communications system in accordance with various embodiments.

FIG. 9 is a flow chart illustrating an embodiment of a method 900 for managing communications in a wireless communications system. For clarity, the method 900 is described below with reference to the wireless communications system 100 or 200 shown in FIGS. 1 and/or 2, and/or with reference to one of the access points 105 described with reference to FIGS. 1, 2, 3, 4, 5, and/or 8. In one implementation, the communications management module 310 described with reference to FIGS. 3, 4, 5, and/or 8 may execute one or more sets of codes to control the functional elements of an access point 105 to perform the functions described below.

At block 905, an inter-access point communications link may be established between a first access point and a second access point. In some embodiments, the operations at block 905 may be performed by the inter-access point communications module 405 described with reference to FIG. 4.

At block 910, the first access point receives one or more performance statistics from the second access point via the inter-access point communications link. In some embodiments, the operations at block 910 may be performed by the performance statistic reception module 410 described with reference to FIG. 4.

At block 915, communication to or from a mobile device via the first access point and the second access point may be managed based at least in part on the received performance statistics. Managing the communication may in some cases include using the one or more performance statistics to determine whether to switch at least a portion of the one or more data flows from the second access point to the first access point when the mobile device is known to or in communication with the first access point. Managing the communication may also include using the one or more performance statistics to determine whether to switch at least a portion of the one or more data flows from the first access point to the second access point when the mobile device is in communication with the first access point. In some examples, managing communication may comprise managing one or more data flows, carrier allocation, or centralized scheduling of resources between the first and second access points. In some embodiments, the operations at block 915 may be performed by the data flow management module 415 described with reference to FIG. 4.

Therefore, the method 900 may be used for communications management in a wireless communications system. It should be noted that the method 900 is just one implementation and that the operations of the method 900 may be rearranged or otherwise modified such that other implementations are possible.

Figure 10:
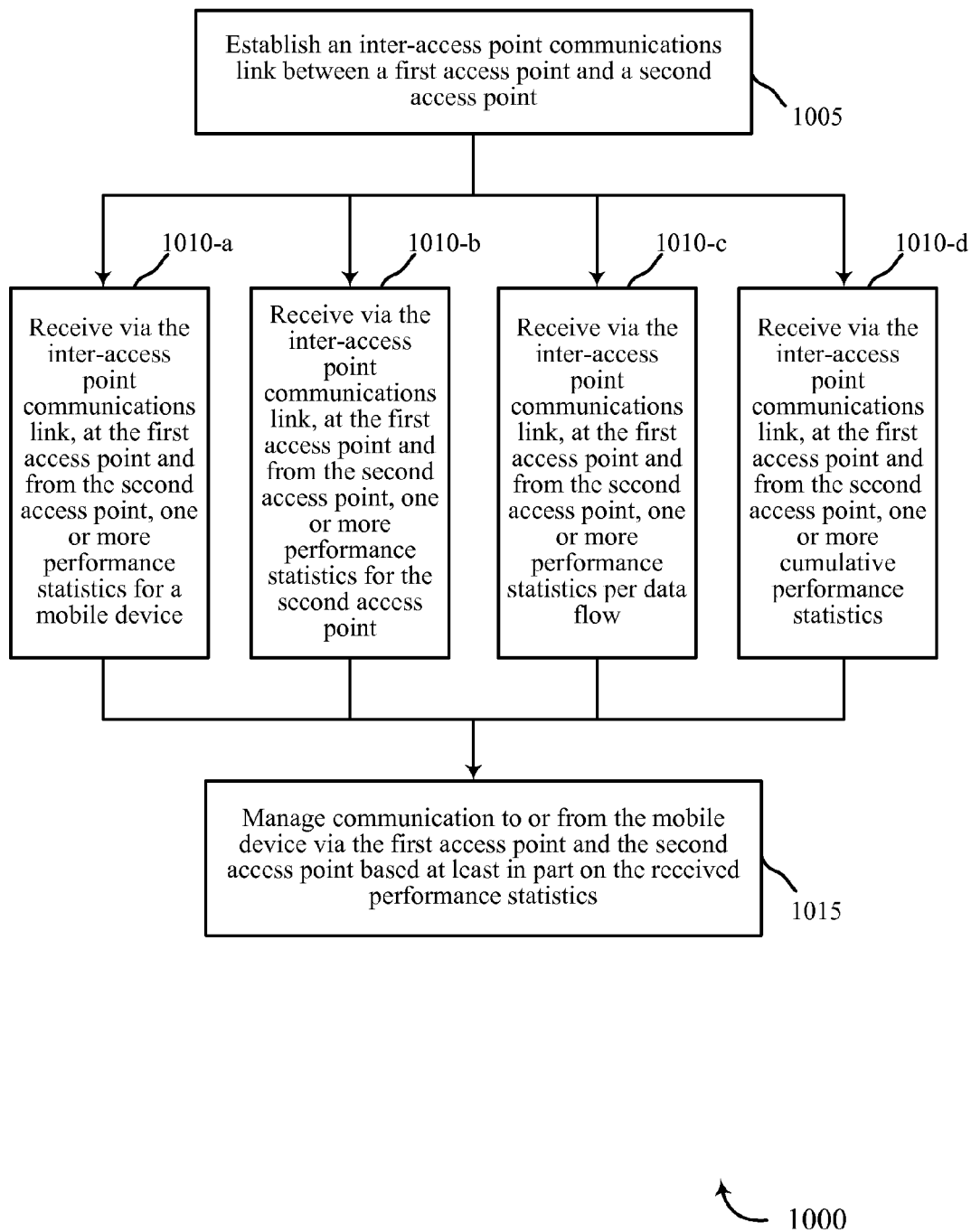
FIG. 10 is a flowchart illustrating an embodiment of another method for managing communications in a wireless communications system in accordance with various embodiments.

FIG. 10 is a flow chart illustrating an embodiment of another method 1000 for managing communications in a wireless communications system. For clarity, the method 1000 is described below with reference to the wireless communications system 100 or 200 shown in FIGS. 1 and/or 2, and/or with reference to one of the access points 105 described with reference to FIGS. 1, 2, 3, 4, 5, and/or 8. In one implementation, the communications management module 310 described with reference to FIGS. 3, 4, 5, and/or 8 may execute one or more sets of codes to control the functional elements of an access point 105 to perform the functions described below.

At block 1005, an inter-access point communications link may be established between a first access point and a second access point. In some embodiments, the operations at block 1005 may be performed by the inter-access point communications module 405 described with reference to FIG. 4.

At blocks 1010-*a*, 1010-*b*, 1010-*c*, and 1010-*d*, the first access point receives one or more performance statistics from the second access point via the inter-access point communications link. For example, at block 1010-*a*, the first access point may receive one or more performance statistics for a mobile device. The second access point may acquire the performance statistics for the mobile device by means of the mobile device being in communication with the second access point. In some cases, there may be multiple mobile devices in communication with the second access point, and the first access point may receive performance statistics for any or all of these mobile devices via the second access point and its inter-access point communications link with the first access point.

At block 1010-*b*, the first access point may receive one or more performance statistics for the second access point.

At block 1010-*c*, the first access point may receive one or more performance statistics per data flow (e.g. per data flow between a mobile device and the second access point). Alternately or additionally, and at block 1010-*d*, the first access point may receive one or more cumulative performance statistics, where each cumulative performance statistic may correspond to a set of at least two data flows.

In some embodiments, the operations at blocks 1010-*a*, 1010-*b*, 1010-*c*, and 1010-*d* may be performed by the performance statistic reception module 410 shown in FIGS. 4 and/or 5.

At block 1015, communication to or from a mobile device via the first access point and the second access point may be managed based at least in part on the received performance statistics. In some embodiments, the operations at block 1015 may be performed by the data flow management module 415 described with reference to FIG. 4.

Therefore, the method 1000 may be used for communications management in a wireless communications system. It should be noted that the method 1000 is just one implementation and that the operations of the method 1000 may be rearranged or otherwise modified such that other implementations are possible.

Figure 11:
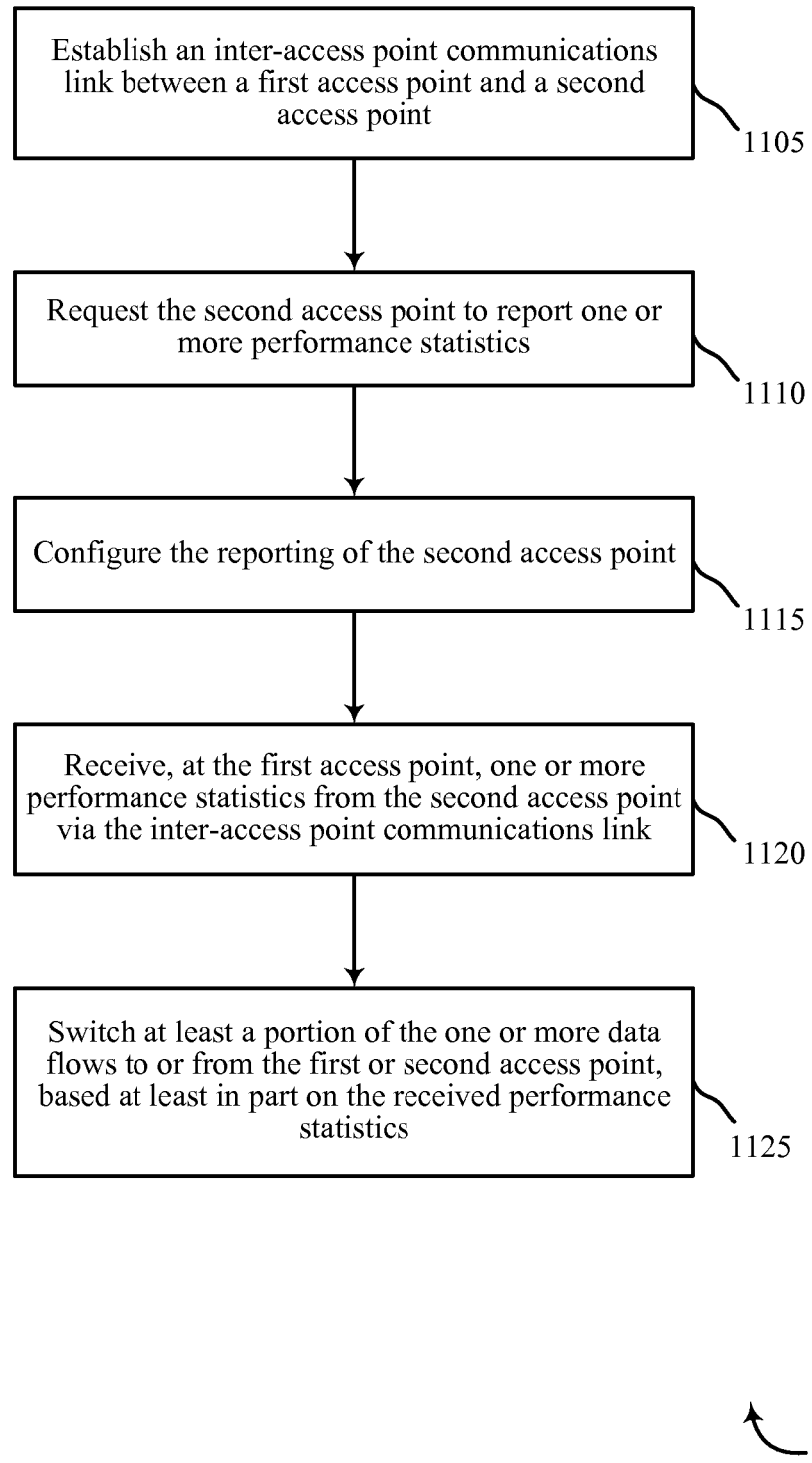
FIG. 11 is a flowchart illustrating an embodiment of yet another method for managing communications in a wireless communications system in accordance with various embodiments.

FIG. 11 is a flow chart illustrating an embodiment of a method 1100 for managing communications in a wireless communications system. For clarity, the method 1100 is described below with reference to the wireless communications system 100 or 200 shown in FIGS. 1 and/or 2, and/or with reference to one of the access points 105 described with reference to FIGS. 1, 2, 3, 4, 5, and/or 8. In one implementation, the communications management module 310 described with reference to FIGS. 3, 4, 5, and/or 8 may execute one or more sets of codes to control the functional elements of an access point 105 to perform the functions described below.

At block 1105, an inter-access point communications link may be established between a first access point and a second access point. In some embodiments, the operations at block 1105 may be performed by the inter-access point communications module 405 described with reference to FIG. 4.

At block 1110, the first access point may transmit a request to report one or more performance statistics to the second access point. The manner in which the second access point reports the one or more performance statistics to the first access point may then be configured at block 1115. For example, in some embodiments, the second access point may be configured to report the one or more performance statistics periodically. In other embodiments, the second access point may be configured to report the one or more performance statistics when an event trigger occurs. When the one or more performance statistics include one or more performance statistics for a mobile device, the event trigger may occur when at least one of the performance statistics for the mobile device satisfies a threshold (e.g., surpasses a threshold, meets a threshold, falls below a threshold, etc.). When the one or more performance statistics include one or more performance statistics for the second access point, the event trigger may occur when at least one of the performance statistics for the second access point satisfies a threshold (e.g., surpasses a threshold, meets a threshold, falls below a threshold, etc.). In one example, a data flow or user load on the second access point surpassing or falling below a threshold may be the event trigger that causes the second access point to report one or more performance statistics to the first access point.

At block 1120, the first access point may receive one or more performance statistics from the second access point via the inter-access point communications link. In some embodiments, the operations at block 910 may be performed by the performance statistic reception module 410 described with reference to FIG. 4.

At block 1125, one or more data flows may be managed based at least in part on the received performance statistics. In particular, data flows to or from a mobile device via the first access point and the second access point may be managed. The one or more data flows may be managed, for example, by switching at least a portion of the data flows to or from the first or second access point when the mobile device is known to or in communication with the first access point. In some embodiments, the operations at block 1125 may be performed by the data flow management module 415 described with reference to FIG. 4.

Therefore, the method 1100 may be used for communications management in a wireless communications system. It should be noted that the method 1100 is just one implementation and that the operations of the method 1100 may be rearranged or otherwise modified such that other implementations are possible.

Although the methods, systems, and apparatuses described herein have been described largely in the context of a first access point being an anchor access point and a second access point being a booster access point, in alternate embodiments, the first access point may be the booster access point and the second access point may be the anchor access point.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for managing communications in a wireless communications system, comprising:
    establishing an inter-access point communications link between a first access point and one or more second access points;
    receiving, at the first access point, one or more performance statistics from the one or more second access points via the inter-access point communications link;
    managing, by the first access point, established communications between a mobile device and the first access point based at least in part on the received performance statistics, and established communications between the mobile device and the one or more second access points based at least in part on the received performance statistics; and
    transferring a portion of data flows of the established communications between the mobile device and the first access point to the established communications between the mobile device and the one or more second access points based at least in part on the received performance statistics.

2. The method of claim 1, wherein managing communication to or from the mobile device comprises managing at least one or more of data flows, carrier allocation, or centralized scheduling of resources between the first access point and the one or more second access points.

3. The method of claim 1, wherein receiving the one or more performance statistics comprises:
    receiving one or more performance statistics for at least one of the mobile device and the one or more second access points.

4. The method of claim 1, wherein managing communication comprises:
    using the one or more performance statistics to determine whether to switch at least a portion of one or more data flows from the one or more second access points to the first access point when the mobile device is known to or in communication with the first access point.

5. The method of claim 1, wherein managing communication comprises:
    using the one or more performance statistics to determine whether to switch at least a portion of one or more data flows from the first access point to the one or more second access points when the mobile device is in communication with the first access point.

6. The method of claim 1, further comprising:
    transmitting a request to the one or more second access points to report the one or more performance statistics.

7. The method of claim 6, wherein the request comprises instructions to report the one or more performance statistics either periodically or when an event trigger occurs.

8. The method of claim 7, wherein:
    the one or more performance statistics comprise one or more performance statistics for at least one of the mobile device and the one or more second access points; and
    the event trigger occurs when at least one of the performance statistics for at least one of the mobile device and the one or more second access points satisfies a threshold.

9. The method of claim 1, wherein the one or more performance statistics comprise at least one of statistic indicating radio resource usage by the mobile device, transmission delay of packets, and served throughput to or from the mobile device.

10. The method of claim 1, wherein the one or more performance statistics comprise at least one statistic relating to a channel information between the mobile device and the one or more second access points, and signal quality measured by the mobile device for at least one access point.

11. The method of claim 1, wherein the one or more performance statistics comprise at least one statistic related to loading or utilization of the inter-access point communications link.

12. The method of claim 1, wherein:
    the first access point comprises an evolved Node B (eNB); and
    the one or more second access points comprises a wireless local area network (WLAN) access point.

13. An apparatus for managing communications in a wireless communications system, comprising:
    a processor;
    memory in electronic communication with the processor; and
    instructions stored in the memory, the instructions being executable by the processor to:
    establish an inter-access point communications link between a first access point and one or more second access points;
    receive, at the first access point, one or more performance statistics from the one or more second access points via the inter-access point communications link;
    manage, by the first access point, established communications between a mobile device and the first access point based at least in part on the received performance statistics, and established communications between the mobile device and the one or more second access points based at least in part on the received performance statistics; and transfer a portion of data flows of the established communications between the mobile device and the first access point to the established communications between the mobile device and the one or more second access points based at least in part on the received performance statistics.

14. The apparatus of claim 13, wherein managing communication to or from the mobile device comprises managing at least one or more of data flows, carrier allocation, or centralized scheduling of resources between the first access point and the one or more second access points.

15. The apparatus of claim 13, wherein the instructions are executable by the processor to:
receive one or more performance statistics for at least one of the mobile device and the one or more second access points.

16. The apparatus of claim 13, wherein the instructions are executable by the processor to:
use the one or more performance statistics to determine whether to switch at least a portion of one or more data flows from the one or more second access points to the first access point when the mobile device is known to or in communication with the first access point.

17. The apparatus of claim 13, wherein the instructions are executable by the processor to:
use the one or more performance statistics to determine whether to switch at least a portion of one or more data flows from the first access point to the one or more second access points when the mobile device is in communication with the first access point.

18. The apparatus of claim 13, wherein the instructions are executable by the processor to:
transmit a request to the one or more second access points to report the one or more performance statistics.

19. The apparatus of claim 18, wherein the request comprises instructions to report the one or more performance statistics either periodically or when an event trigger occurs.

20. The apparatus of claim 19, wherein:
the one or more performance statistics comprise one or more performance statistics for at least one of the mobile device and the one or more second access points; and
the event trigger occurs when at least one of the performance statistics for at least one of the mobile device and the one or more second access points satisfies a threshold.

21. The apparatus of claim 13, wherein the one or more performance statistics comprise at least one of statistic indicating radio resource usage by the mobile device, transmission delay of packets, and served throughput to or from the mobile device.

22. The apparatus of claim 13, wherein the one or more performance statistics comprise at least one statistic relating to channel information between the mobile device and the one or more second access points, and signal quality measured by the mobile device for at least one access point.

23. The apparatus of claim 13, wherein the one or more performance statistics comprise at least one statistic related to loading or utilization of the inter-access point communications link.

24. An apparatus for managing communications in a wireless communications system, comprising:

means for establishing an inter-access point communications link between a first access point and one or more second access points;

means for receiving, at the first access point, one or more performance statistics from the one or more second access points via the inter-access point communications link;

means for managing, by the first access point, established communications between a mobile device and the first access point based at least in part on the received performance statistics, and established communications between the mobile device and the one or more second access points based at least in part on the received performance statistics; and a processor configured to transfer a portion of data flows of the established communications between the mobile device and the first access point to the established communications between the mobile device and the one or more second access points based at least in part on the received performance statistics.

25. The apparatus of claim 24, wherein managing communication to or from the mobile device comprises managing at least one or more of data flows, carrier allocation, or centralized scheduling of resources between the first access point and the one or more second access points.

26. The apparatus of claim 24, wherein the means for receiving the one or more performance statistics comprises:
means for receiving one or more performance statistics for at least one of the mobile device and the one or more second access points.

27. The apparatus of claim 24, further comprising:
means for transmitting a request to the one or more second access points to report the one or more performance statistics.

28. The apparatus of claim 27, wherein the request comprises instructions to report the one or more performance statistics either periodically or when an event trigger occurs.

29. The apparatus of claim 28, wherein:
the one or more performance statistics comprise one or more performance statistics for at least one of the mobile device and the one or more second access points; and
the event trigger occurs when at least one of the performance statistics for at least one of the mobile device and the one or more second access points satisfies a threshold.

30. A computer program product for managing communications in a wireless communications system, the computer program product comprising a non-transitory computer-readable medium storing instructions executable by a processor to:

establish an inter-access point communications link between a first access point and one or more second access points;

receive, at the first access point, one or more performance statistics from the one or more second access points via the inter-access point communications link;

manage, by the first access point, established communications between a mobile device the first access point based at least in part on the received performance statistics, and established communications between the mobile device and the one or more second access points based at least in part on the received performance statistics; and transfer a portion of data flows of the established communications between the mobile device and the first access point to the established communications between the mobile device and the one or more second access points based at least in part on the received performance statistics.

31. The computer program product of claim 30, wherein managing communication to or from the mobile device comprises managing at least one or more of data flows, carrier allocation, or centralized scheduling of resources between the first access point and the one or more second access points.

* * * * *